US009810301B2

United States Patent
Kwon et al.

(10) Patent No.: US 9,810,301 B2
(45) Date of Patent: Nov. 7, 2017

(54) TORQUE CONVERTER IN VEHICLE

(71) Applicant: Korea Powertrain Co., Ltd., Daegu (KR)

(72) Inventors: Ki-Hyun Kwon, Daegu (KR); Gi-Woo Kim, Incheon (KR); Soon-Seok Hong, Daegu (KR)

(73) Assignee: Korea Powertrain Co., Ltd., Daegu (KR)

( * ) Notice: Subject to any disclaimer, the term of this patent is extended or adjusted under 35 U.S.C. 154(b) by 209 days.

(21) Appl. No.: 14/408,615

(22) PCT Filed: Apr. 9, 2013

(86) PCT No.: PCT/KR2013/002938
§ 371 (c)(1),
(2) Date: Dec. 17, 2014

(87) PCT Pub. No.: WO2014/084458
PCT Pub. Date: Jun. 5, 2014

(65) Prior Publication Data
US 2015/0260270 A1    Sep. 17, 2015

(30) Foreign Application Priority Data

Nov. 28, 2012 (KR) .................. 10-2012-0136545

(51) Int. Cl.
*F16H 45/02* (2006.01)
*F16F 15/14* (2006.01)
(Continued)

(52) U.S. Cl.
CPC ........... *F16H 45/02* (2013.01); *F16F 15/123* (2013.01); *F16F 15/13128* (2013.01);
(Continued)

(58) Field of Classification Search
CPC ............... F16F 15/123; F16F 15/13128; F16F 15/1471; F16H 45/02; F16H 2045/0205;
(Continued)

(56) References Cited

U.S. PATENT DOCUMENTS 4,291,790 A * 9/1981 Staub, Jr. ................ F16H 45/02
192/209
6,006,879 A * 12/1999 Sudau ............... F16F 15/13157
192/207

(Continued)

FOREIGN PATENT DOCUMENTS

| JP | 2011-526344 A | 10/2011 |
| JP | 2012506004 A | 3/2012 |
| JP | 2012-077826 A | 4/2012 |

OTHER PUBLICATIONS

International Search Report and Written Opinion dated Jun. 21, 2013 relating to PCT/KR13/002938.

*Primary Examiner* — Terry Chau
(74) *Attorney, Agent, or Firm* — Dinsmore & Shohl LLP

(57) ABSTRACT

Disclosed is a torque converter in a vehicle, in which a torsional damper reduces a natural frequency and absorbs vibration energy in an anti-resonance state for enhancing a vibration isolation function. The torque converter in a vehicle includes a torsional damper including a retaining plate coupled to the piston, a plurality of springs arranged at the retaining plate for imparting elastic force in a circumferential direction, a driven plate coupled to a spline hub which acts as a reaction force on the springs and forwards driving power to a transmission, and an inertial lever arranged between the piston and the driven plate, the inertial lever including a fixed pivot coupling portion coupled to the piston with a fixed pivot and a movable pivot coupling portion coupled to the driven plate with a movable pivot.

5 Claims, 9 Drawing Sheets

(51) Int. Cl.
*F16F 15/131* (2006.01)
*F16F 15/123* (2006.01)

(52) U.S. Cl.
CPC .. *F16F 15/1471* (2013.01); *F16H 2045/0205* (2013.01); *F16H 2045/0226* (2013.01); *F16H 2045/0263* (2013.01); *F16H 2045/0278* (2013.01); *F16H 2045/0294* (2013.01)

(58) Field of Classification Search
CPC ..... F16H 2045/0226; F16H 2045/0263; F16H 2045/0278; F16H 2045/0294
USPC ........................ 192/3.28, 3.29, 3.3; 60/338
See application file for complete search history.

(56) References Cited

U.S. PATENT DOCUMENTS

| | | |
|---|---|---|
| 2010/0242466 A1 | 9/2010 | Krause et al. |
| 2011/0240429 A1* | 10/2011 | Heuler ................. F16F 15/145 192/3.28 |
| 2012/0080281 A1* | 4/2012 | Takikawa ................ F16H 45/02 192/3.28 |
| 2012/0180473 A1 | 7/2012 | Huegel et al. |

* cited by examiner

TORQUE CONVERTER IN VEHICLE

CROSS-REFERENCE TO RELATED APPLICATIONS

This application is the U.S. National Phase of PCT/KR2013/002938 filed Apr. 9, 2013, which claims priority of Korean Patent Application No. 10-2012-0136545 filed Nov. 28, 2012.

BACKGROUND OF THE INVENTION (a) Field of the Invention

The present invention relates to a torque converter in a vehicle, in which a torsional damper reduces a natural frequency and absorbs vibration energy in an anti-resonance state for enhancing a vibration isolation function.

(b) Description of the Related Art

In general, the torque converter is mounted between an engine and a transmission of the vehicle for transmission of driving power from the engine to the transmission by using a fluid. The torque converter is provided with an impeller for receiving driving power from the engine to rotate, a turbine for being rotated by oil being discharged from the impeller, and a reactor (called a 'stator') for directing an oil flow returning to the impeller to a rotation direction of the impeller to enhance a torque change rate.

Since power transmission efficiency of the torque converter may become poorer if a load on the engine becomes high, the torque converter has a lock-up clutch (called a 'damper clutch') which can directly connect the engine and the transmission. The lock-up clutch is arranged between a front cover directly connected to the engine and the turbine for transmission of the torque directly from the engine to the transmission through the turbine.

The lock-up clutch includes a piston at a turbine shaft, which is movable in an axis direction. The piston has a friction member coupled thereto to be in frictional contact with the front cover. The piston has the torsional damper coupled thereto for absorbing an impact and vibration acting in a rotation direction of the shaft when the friction member is coupled to the front cover.

The torsional damper has springs mounted thereto in a rotation direction for absorbing a torsional torque in a case the lock-up clutch is operated to enable the torsional damper to directly transmit the driving power from the engine to the transmission through the turbine.

That is, a related art torsional damper has a problem in that use of coil springs for the most part arranged in a circumferential direction causes inadequate vibration isolation.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a torque converter in a vehicle having advantages of enhancing a vibration isolation function and an inertia force when a torsional damper is in action as well as reducing a natural frequency.

Accordingly, an object of the present invention suggested for solving the problem is to provide a torque converter in a vehicle, which can enhance a vibration isolation function and an inertia force as well as reduce a natural frequency when a torsional damper is in action.

To achieve the object of the present invention, a torque converter in a vehicle includes a front cover, an impeller connected to the front cover to rotate together with the front cover, a turbine arranged at a position opposite to the impeller, a reactor positioned between the impeller and the turbine for changing oil flow from the turbine toward the impeller, a lock-up clutch having a piston for directly connecting the front cover to the turbine, and a torsional damper coupled to the lock-up clutch for absorbing an impact and vibration acting in a rotation direction.

The torsional damper includes a retaining plate coupled to the piston, a plurality of springs arranged at the retaining plate for imparting elastic force in a circumferential direction, a driven plate coupled to a spline hub which acts as a reaction force on the springs and forwards driving power to a transmission, and an inertial lever arranged between the piston and the driven plate, the inertial lever including a fixed pivot coupling portion coupled to the piston with a fixed pivot and a movable pivot coupling portion coupled to the driven plate with a movable pivot.

It is preferable that the inertial lever has ballast coupled to one end or both ends thereof.

It is preferable that the fixed pivot coupling portion is arranged between the movable pivot coupling portion of the inertial lever and the ballast coupled to the inertial lever.

It is preferable that the movable pivot coupling portion is a long hole provided in the inertial lever in a radial direction of a rotation shaft to pass through the inertial lever in a direction of the rotation shaft for coupling the inertial lever to the driven plate with a shaft member.

Advantageous Effects

The torque converter in a vehicle in accordance with exemplary embodiments of the present invention has the inertial lever with ballast coupled to the piston with a fixed pivot and coupled to the driven plate with a movable pivot to increase mass, enabling generation of high inertial force as well as generation of an anti-resonance state owing to the ballast moving in a direction opposite to an acting direction of the driven plate, when the torsional damper is in action.

Therefore, the torque converter in a vehicle in accordance with exemplary embodiments of the present invention has advantages in that the vibration isolation function and the inertial force can be increased and the natural frequency can be reduced.

DETAILED DESCRIPTION OF THE EMBODIMENTS

Figure 1:
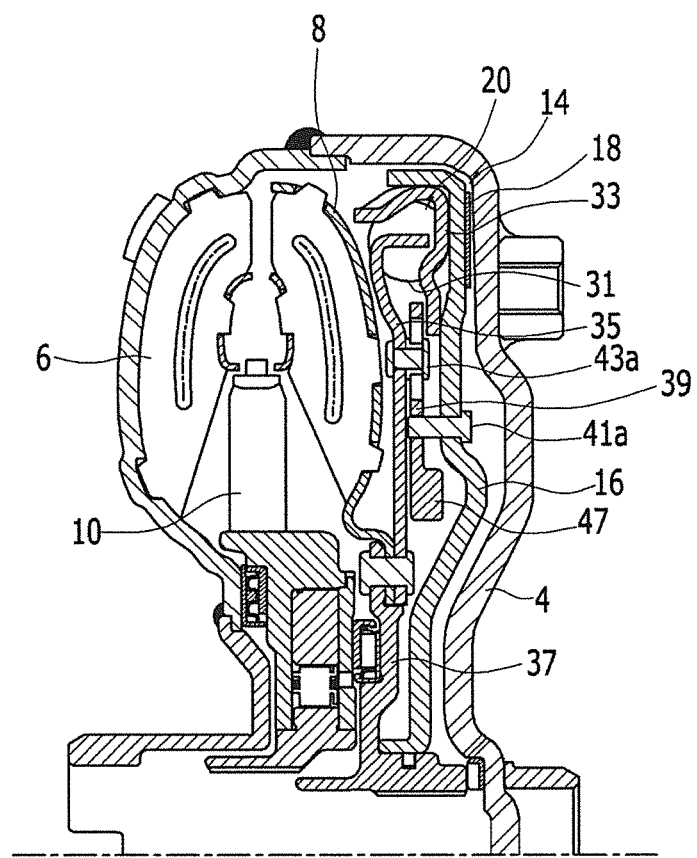
FIG. 1 is an axial half cross-sectional view of a torque converter for describing an exemplary embodiment of the present invention.

Hereafter, a torque converter in a vehicle in accordance with exemplary embodiments of the present invention will be described with reference to the accompanying drawings such that persons ordinarily skilled in the art may carry easily out the present invention. As those skilled in the art would realize, the described embodiments may be modified in various different ways, all without departing from the spirit or scope of the present invention. Parts in the drawings that are not relevant to the description of the present invention are omitted for describing the present invention clearly, and like reference numerals designate like elements throughout the specification.

FIG. 1 is an axial half cross-sectional view of a torque converter in a vehicle for describing a first exemplary embodiment of the present invention.

The torque converter in accordance with a first exemplary embodiment of the present invention includes a front cover 4 rotatably connected to a crankshaft of an engine, an impeller 6 connected to the front cover 4 to rotate together with the front cover 4, a turbine 8 arranged at a position opposite to the impeller 6, and a reactor (called a 'stator') 10 positioned between the impeller 6 and the turbine 8 for changing an oil flow from the turbine 8 to forward the oil flow toward the impeller 6. The reactor 10 which forwards the oil toward the impeller 6 has the same rotation center as the front cover 4. A lock-up clutch 14 used as means for connecting the engine to the transmission directly is arranged between the front cover 4 and the turbine 8.

The lock-up clutch 14 having a substantially disc shape has a piston 16 provided thereto to be movable in an axial direction.

The piston 16 has a friction member 18 coupled thereto to be brought into frictional contact with the front cover 4.

The lock-up clutch 14 has a torsional damper 20 coupled thereto for absorbing a torsional force acting in a rotation direction of the shaft and attenuating vibration when the friction member 18 is brought into close contact with the front cover 4.

Figure 2:
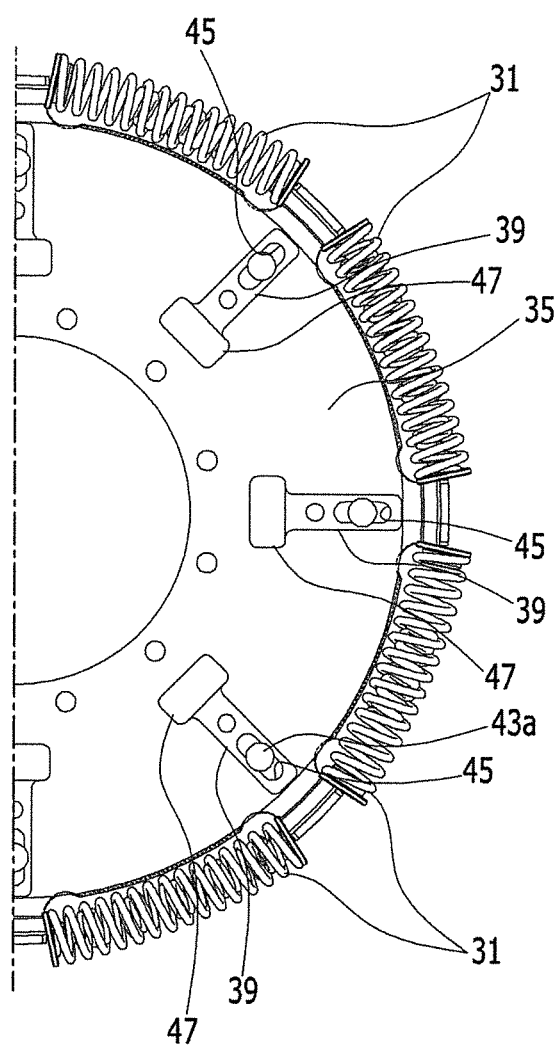
FIG. 2 is a drawing showing an inertial lever coupled to a driven plate for describing an exemplary embodiment of the present invention.

Referring to FIGS. 1 and 2, the torsional damper 20 has springs 31 provided thereto for absorbing an impact and vibration acting in a circumferential direction. It is preferable that the springs 31 are compression coil springs arranged in the circumferential direction (rotation direction).

The springs 31 are retained by a retaining plate 33 coupled to the piston 16. The springs 31 are elastically supported by a driven plate 35. That is, the springs 31 are elastically held between the retaining plate 33 and the driven plate 35, thereby absorbing the vibration and the impact in the rotation direction (circumferential direction).

The driven plate 35 may be coupled with a rivet to a spline hub 37 which forwards driving power to the transmission.

Figure 3:
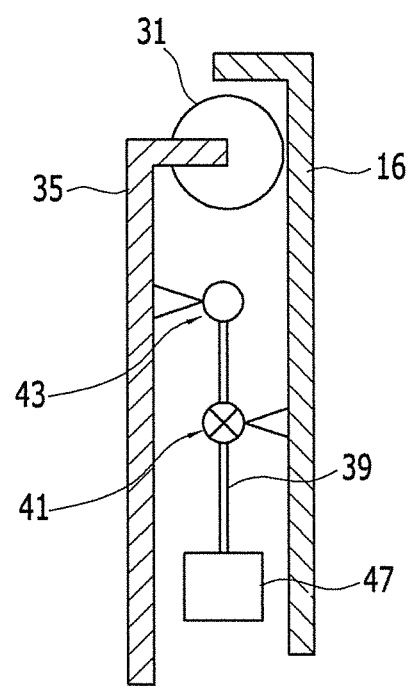
FIG. 3 is a drawing showing an example of an inertial lever coupled to a piston and a driven plate for schematically describing an exemplary embodiment of the present invention.

An inertial lever 39 is arranged between the piston 16 and the driven plate 35. The inertial lever 39 has a center portion with a fixed pivot coupling portion 41 provided thereto coupled to the piston 16 with a fixed pivot, and one other portion with a movable pivot coupling portion 43 provided thereto coupled to the driven plate 35 with a movable pivot (see FIGS. 2 and 3).

The fixed pivot coupling portion 41 has a hole provided at a middle portion of the inertial lever 39 passed through in a direction parallel to a shaft, with a shaft member 41a placed therein to connect to the piston 16. That is, the inertial lever 39 is made to rotate freely at the piston 16 by the fixed pivot coupling portion 41.

The movable pivot coupling portion 43 has a long hole 45 provided in one side of the inertial lever 39 parallel to a shaft, with another shaft member 43a placed therein, enabling the inertial lever 39 to move as the shaft member 43a moves along the long hole 45.

The long hole 54 may serve as a stopper since the long hole 45 restricts movements of the inertial lever 39 as the shaft member 43a is brought into contact with either end of the long hole 45 and restricts an operation angle of the driven plate 35 coupled to the inertial lever 39, preventing damage to the spring 31 when the spring 31 comes into full close contact.

In the meantime, the inertial lever 39 may have ballast 47 provided to one or both ends thereof. The ballast 47 may be formed of a material that is the same as that of the inertial lever 39 as one unit therewith, or may be a separate member coupled to the inertial lever 39 with coupling means.

The ballast 47 may increase inertial force by increasing mass of the torsional damper 20 including the piston 16 or the driven plate 35.

The operation of the torque converter in a vehicle in accordance with an exemplary embodiment of the present invention will be described.

If the lock-up clutch 14 is operated, as the piston 16 moves toward the front cover 4, the friction member 18 is brought into close contact with the front cover 4 to forward the driving power of the engine which is transmitted to the front cover 4 to the piston 16. The driving power is forwarded from the piston 16 to the retaining plate 33 for the retaining plate 33 to apply pressure to the spring 31.

Figure 4:
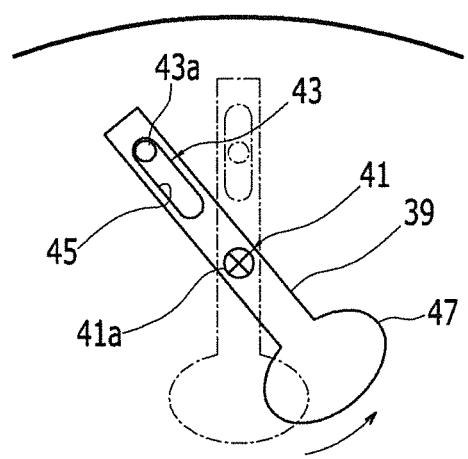
FIG. 4 is a drawing showing a state in which an inertial lever moves when a torsional damper is in action for describing an exemplary embodiment of the present invention.

Then, the spring 31 is compressed to apply pressure to the driven plate 35. In this case, the spring 31 initially absorbs the vibration and the impact in the rotation direction. As the piston 16 and the driven plate 35 rotate, the inertial lever 39 rotates in an arrow direction as shown in FIG. 4, which is an opposite direction of a rotation direction of the driven plate 35. The inertial lever 39 and the ballast 47 of the inertial lever 39 may serve as a mass, to secondly absorb the vibration and the impact.

Particularly, the mass of the torsional damper 20 increased by the inertial lever 39 and the ballast 47 serves as a damper to absorb vibration energy in anti-resonance, thereby increasing a vibration isolation function.

In the meantime, as the driven plate 35 rotates, the shaft member 43a is brought into contact with an end portion of the long hole 45 in the inertial lever 39. Therefore, the movement of the inertial lever 39 and the rotation of the driven plate 35 are restricted, making the long hole 45 function as the stopper.

In succession, the driving power forwarded to the driven plate 35 is forwarded to the transmission through the spline hub 37.

Figure 5:
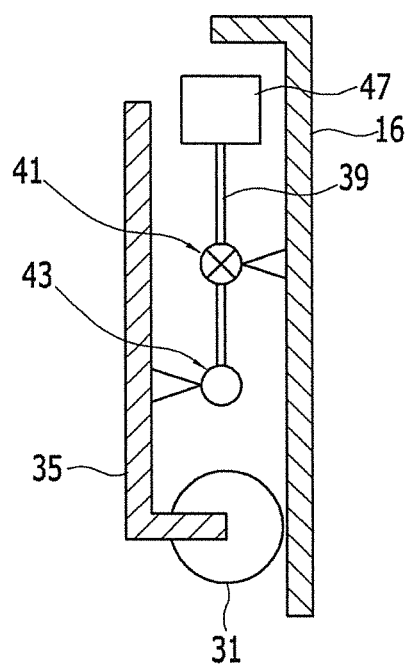
FIG. 5 is a drawing showing another exemplary embodiment of the present invention.

FIG. 5 is a drawing showing another exemplary embodiment of the present invention, showing a state in which the inertial lever 39 is coupled to the piston 16 and the driven plate 35.

In describing the current exemplary embodiment of the present invention, only differences from the foregoing exemplary embodiment will be described by comparing the current exemplary embodiment to the foregoing exemplary embodiment, and description of identical portions will be replaced with the foregoing example.

The exemplary embodiment shown in FIG. 5 has the ballast 47 coupled to an outside circumference of the inertial lever 39, and the spring 31 arranged on an inside circumference of the inertial lever 39.

Figure 6:
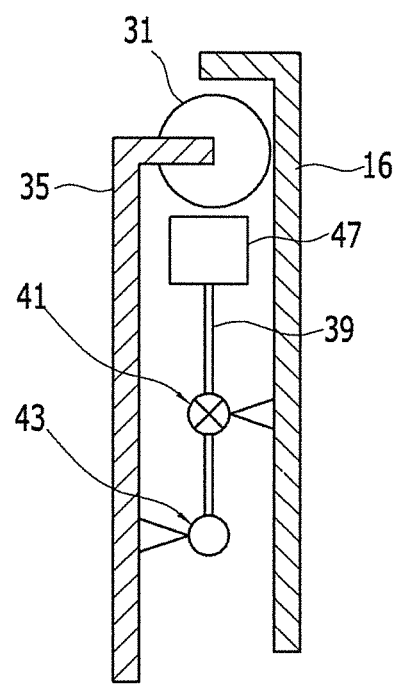
FIG. 6 is a drawing showing another exemplary embodiment of the present invention.

FIG. 6 is a drawing showing another exemplary embodiment of the present invention, showing a state in which the inertial lever 39 is coupled to the piston 16 and the driven plate 35.

In describing the current exemplary embodiment of the present invention, only differences from the foregoing exemplary embodiment will be described by comparing them, and description of identical portions will be replaced with the foregoing example.

The exemplary embodiment shown in FIG. 6 has the ballast 47 coupled to an outside circumference of the inertial lever 39, and the spring 31 arranged on the outside circumference of the inertial lever 39.

Figure 7:
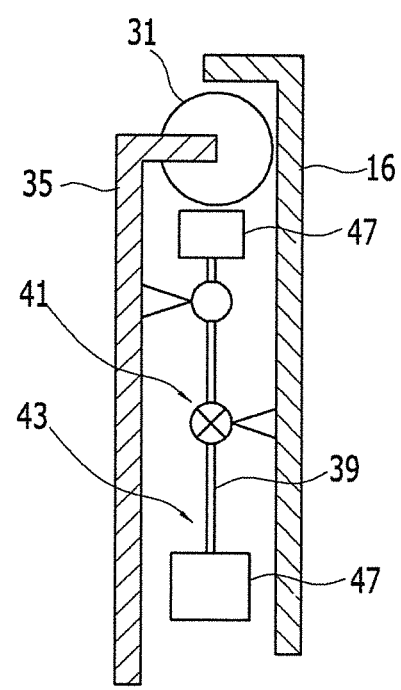
FIG. 7 is a drawing showing another exemplary embodiment of the present invention.

FIG. 7 is a drawing showing another exemplary embodiment of the present invention, showing a state in which the inertial lever 39 is coupled to the piston 16 and the driven plate 35.

In describing the current exemplary embodiment of the present invention, only differences from the foregoing exemplary embodiment will be described by comparing them, and description of identical portions will be replaced with the foregoing example.

The exemplary embodiment shown in FIG. 7 has the ballast 47 provided at both the inside and outside circumferences of the inertial lever 39, and the spring 31 arranged on the outside circumference of the inertial lever 39.

Figure 8:
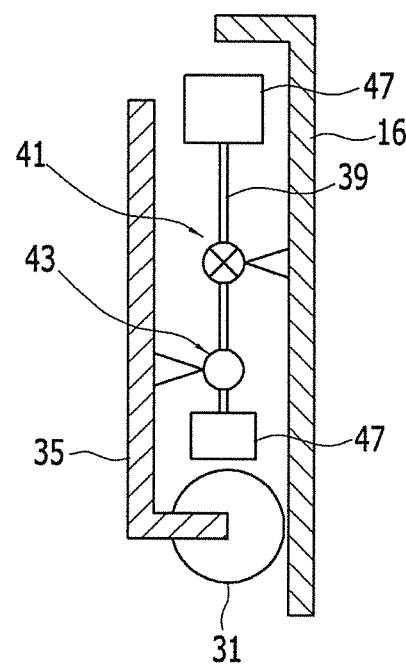
FIG. 8 is a drawing showing another exemplary embodiment of the present invention.

FIG. 8 is a drawing showing another example of an exemplary embodiment of the present invention, showing a state in which the inertial lever 39 is coupled to the piston 16 and the driven plate 35.

In describing the current exemplary embodiment of the present invention, only differences from the foregoing exemplary embodiment will be described by comparing them, and description of identical portions will be replaced with the foregoing example.

The example of exemplary embodiment shown in FIG. 8 has the ballast 47 provided at both the inside and outside circumferences of the inertial lever 39, and the spring 31 arranged on the inside circumference of the inertial lever 39.

Figure 9:
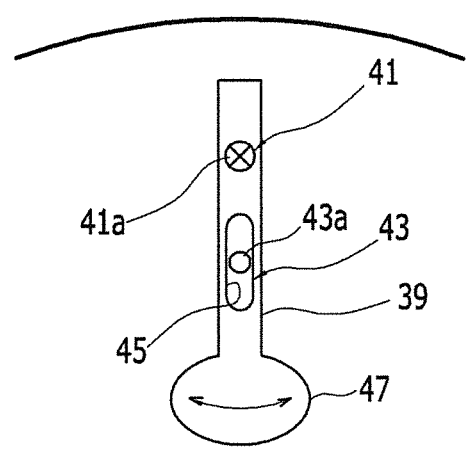
FIG. 9 is a drawing showing another exemplary embodiment of the present invention.

FIG. 9 is a drawing showing another example of an exemplary embodiment of the present invention, showing a state in which the inertial lever 39 is coupled to the piston 16 and the driven plate 35.

In describing the current exemplary embodiment of the present invention, only differences from the foregoing exemplary embodiment will be described by comparing them, and description of identical portions will be replaced with the foregoing example.

The exemplary embodiment shown in FIG. 9 has the movable pivot coupling portion 43 arranged between the ballast 47 and the fixed pivot coupling portion 41 of the inertial lever 39.

Thus, the examples of the exemplary embodiments of the present invention shown in FIGS. 5 to 9 and described herein show that the exemplary embodiments of the present invention may be configured in a variety of modes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A torque converter in a vehicle comprising:
a front cover;
an impeller connected to the front cover to rotate together with the front cover;
a turbine arranged at a position opposite to the impeller;
a reactor positioned between the impeller and the turbine for changing an oil flow from the turbine toward the impeller;
a lock-up clutch having a piston for directly connecting the front cover to the turbine; and
a torsional damper coupled to the lock-up clutch for absorbing an impact and vibration acting in a rotation direction,
wherein the torsional damper includes
a retaining plate coupled to the piston,
a plurality of springs arranged at the retaining plate for imparting elastic force in a circumferential direction,
a driven plate coupled to a spline hub which acts as a reaction force on the springs and forwards driving power to a transmission, and
an inertial lever arranged between the piston and the driven plate, the inertial lever including a fixed pivot coupling portion coupled to the piston with a fixed pivot and a movable pivot coupling portion coupled to the drivers plate with a movable pivot.

2. The torque converter of claim 1, wherein the inertial lever has a ballast coupled to one end or two ballasts each coupled to one of two ends thereof.

3. The torque converter of claim 1, wherein the fixed pivot coupling portion is arranged between the movable pivot coupling portion of the inertial lever and a ballast coupled to the inertial lever.

4. The torque converter of claim 1, wherein the movable pivot coupling portion is arranged between the fixed pivot coupling portion of the inertial lever and a ballast coupled to the inertial lever.

5. The torque converter of claim 1, wherein the movable pivot coupling portion is a long hole provided in the inertial lever in a radial direction of a rotation shaft to pass through the inertial lever in a direction of the rotation shaft for coupling the inertial lever to the driven plate with a shaft member.

* * * * *